US007956952B2

United States Patent
Tanaka (10) Patent No.: US 7,956,952 B2
(45) Date of Patent: Jun. 7, 2011

(54) LIQUID CRYSTAL MODULE WITH LAMP SOCKET HAVING SLITS THAT RECEIVE TABS OF LAMP REFLECTOR

(75) Inventor: Kazuya Tanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 574 days.

(21) Appl. No.: 12/136,818

(22) Filed: Jun. 11, 2008

(65) Prior Publication Data

US 2009/0002593 A1  Jan. 1, 2009

(30) Foreign Application Priority Data

Jun. 21, 2007 (JP) ................. 2007-163258

(51) Int. Cl.
 *G02F 1/1335* (2006.01)
 *F01D 11/28* (2006.01)
 *F21V 7/04* (2006.01)
(52) U.S. Cl. ................. 349/61; 349/62; 349/67; 349/68; 349/69; 349/70; 362/26; 362/27; 362/29; 362/30; 362/608; 362/611; 362/614; 362/615
(58) Field of Classification Search ............. 349/61–62, 349/67–71; 362/26, 27, 29, 30, 608, 611, 362/613, 614, 615, 97.1, 97.2
See application file for complete search history.

(56) References Cited

U.S. PATENT DOCUMENTS

| 5,537,296 A | * | 7/1996 | Kimura et al. ............. 362/634 |
| 7,021,813 B2 | * | 4/2006 | Lee et al. ................. 362/609 |
| 7,448,784 B2 | * | 11/2008 | Tanaka ................. 362/611 |

FOREIGN PATENT DOCUMENTS

| JP | 04-33076 U | 3/1992 |
| JP | 2001-147422 A | 5/2001 |
| JP | 2004-309969 A | 11/2004 |
| JP | 2005-243485 A0 | 9/2005 |
| JP | 2005-302533 A | 10/2005 |
| JP | 2006-147435 A | 6/2006 |

* cited by examiner

*Primary Examiner* — Hoan C Nguyen
(74) *Attorney, Agent, or Firm* — Global IP Counselors (57) ABSTRACT

A liquid crystal module includes a liquid crystal panel and a back light unit. The back light unit has a rear frame, a light guide plate and a lamp reflector assembly. The lamp reflector assembly including a light source, a lamp reflector and a lamp socket. The lamp reflector has a front plate, a rear plate and a side plate with a tab. At least one of the front plate and the rear plate has a fixing hole. The lamp socket has a fixing protrusion that is fitted into the fixing hole of the lamp reflector, and a slit that receives the tab of the lamp reflector.

13 Claims, 6 Drawing Sheets

LIQUID CRYSTAL MODULE WITH LAMP SOCKET HAVING SLITS THAT RECEIVE TABS OF LAMP REFLECTOR

CROSS-REFERENCE TO RELATED APPLICATIONS

This application claims priority to Japanese Patent Application No. 2007-163258 filed on Jun. 21, 2007. The entire disclosure of Japanese Patent Application No. 2007-163258 is hereby incorporated herein by reference.

BACKGROUND OF THE INVENTION

1. Field of the Invention

The present invention generally relates to a liquid crystal module. More specifically, the present invention relates to a liquid crystal module having a back light unit.

2. Background Information

A conventional liquid crystal module includes a liquid crystal panel and a back light unit. The back light unit is disposed on a rear side of the liquid crystal panel. The back light unit has a rear frame, a light guide plate and a lamp reflector assembly. The rear frame houses the light guide plate. The lamp reflector assembly includes a cold cathode tube, a lamp reflector and a plurality of lamp sockets. The cold cathode tube is disposed on an inside of the lamp reflector. The lamp sockets are disposed at both ends of the cold cathode tube. The lamp sockets are fixed to both ends of the lamp reflector. The lamp reflector assembly is inserted between side end faces of the light guide plate and side plates of the rear frame. The lamp reflector is attached and fixed to the rear frame with fasteners (screws). The lamp reflector has fixing holes on upper and lower face plates of the lamp reflector. The lamp sockets have fixing protrusions on upper and lower faces of the lamp socket. The fixing protrusions are fitted into the fixing holes to fix the lamp sockets to the lamp reflector.

With another conventional liquid crystal module, latching protrusions are provided to upper and lower faces of a socket main body (see Japanese Laid-Open Patent Application No. 2006-147435, for example). Latching holes are correspondingly formed in upper and lower face plates at both ends of lamp reflector. The latching protrusions are fitted into the latching holes so that the socket main body is positioned and attached to both ends of the lamp reflector.

Another conventional lighting device for a liquid crystal display unit includes a tubular light source and a reflector (see Japanese Laid-Open Utility Model Application No. H4-33076, for example). Annular grooves are formed around an outer periphery of sockets at both ends of the tubular light source. The sockets are inserted into attachment holes formed in the reflector. Peripheral edges of the attachment holes are mated with the annular grooves so that the sockets are positioned and attached to the reflector.

Furthermore, another conventional liquid crystal display device includes two lamp reflectors and a frame (see Japanese Laid-Open Patent Application No. 2005-243485, for example). The lamp reflectors are disposed on adjacent two sides of the liquid crystal display device. Each of the lamp reflectors has a concave component at a corner of the adjacent two sides. The lamp reflectors are fixed to a frame at the same time with a single screw.

Moreover, another conventional liquid crystal display device includes lamp cover and a molded frame (Japanese Laid-Open Patent Application No. 2001-147422, for example). The lamp cover includes protrusions as an affixing structure. The molded frame includes receiving holes at positions corresponding to the protrusions. The protrusions are passed through the receiving holes, and distal ends of the protrusions are then crimped.

With the above-mentioned conventional liquid crystal module, the lamp sockets are positioned and fixed at the ends of the lamp reflector merely by fitting the lamp sockets to the ends of the lamp reflector, and fitting the fixing protrusions in the fixing holes. Thus, the lamp sockets are prone to misalignment if the fixing protrusions are not securely fitted into the fixing holes during the fixing of the lamp sockets, or if the fixing protrusions come out of the fixing holes after the lamp reflector assembly is installed.

Furthermore, with the above-mentioned conventional liquid crystal module, the lamp reflector assembly is inserted between the side end faces of the light guide plate and the side plates of the rear frame, and the lamp reflector is attached and fixed to the rear frame with the screws. Thus, the threading of the screws leads to lower assembly efficiency and higher cost. Furthermore, maintenance entails more work in replacing the cold cathode tube.

With the lighting device in the above-mentioned Japanese Laid-Open Patent Application No. 2006-147435, the socket main body is positioned and attached to the ends of the lamp reflector by fitting the latching protrusions of the socket main body into the latching holes of the lamp reflector. Thus, the socket main body is prone to misalignment.

With the lighting device in the above-mentioned Japanese Laid-Open Utility Model Application No. H4-33076, the sockets are inserted in the attachment holes formed in the reflector, and the peripheral edges of the attachment holes are mated with the annular grooves around the outer periphery of the sockets. Thus, attaching the sockets is unsafe and difficult. Furthermore, an attachment structure such as this is unsuited to attaching sockets to ends of a slender lamp reflector having an ordinary open box section shape.

Also, with the liquid crystal display device in the above-mentioned Japanese Laid-Open Patent Application No. 2005-243485, the two lamp reflectors are fixed at the same time with a single screw to the frame. While this does reduce the number of screws used, it still entails troubles of threading the screw. Thus, assembly efficiency becomes poor, and maintenance entails more work in replacing lamps.

With the liquid crystal display device in the above-mentioned Japanese Laid-Open Patent Application No. 2001-147422, the protrusions are passed through the receiving holes, and the distal ends of the protrusions are crimped to attach the components. Since the crimping has to be performed, assembly efficiency becomes poor and manufacturing cost cannot be reduced. Furthermore, the lamp cover cannot be easily removed during maintenance.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a liquid crystal module with which lamp socket misalignment can be reliably prevented.

In accordance with one aspect of the present invention, a liquid crystal module includes a liquid crystal panel and a back light unit. The back light unit is disposed on a rear side of the liquid crystal panel. The back light unit has a rear frame, a light guide plate and a lamp reflector assembly. The light guide plate is disposed in the rear frame. The lamp reflector assembly is disposed between a side wall of the rear frame and an outer peripheral face of the light guide plate. The lamp reflector assembly including a light source, a lamp reflector and a lamp socket. The lamp reflector houses the light source. The lamp reflector has a front plate, a rear plate opposing the front plate and a side plate with a tab that is formed on a longitudinal end portion of the side plate. At least one of the front plate and the rear plate has a fixing hole that is formed on a longitudinal end section of the at least one of the front plate and the rear plate. The lamp socket is disposed on a longitudinal end of the light source and attached to a longitudinal end of the lamp reflector to hold the light source with respect to the lamp reflector. The lamp socket has a fixing protrusion that is formed on at least one of a front face of the lamp socket and a rear face of the lamp socket at a location corresponding to the fixing hole of the lamp reflector and is fitted into the fixing hole of the lamp reflector, and a slit that is formed at a location corresponding to the tab of the lamp reflector and receives the tab of the lamp reflector.

With the liquid crystal module of the present invention, it is possible to provide a liquid crystal module with which lamp socket misalignment can be reliably prevented.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following descriptions of the preferred embodiment of the present invention is provided for illustration only and not for the purpose of limiting the invention as defined by the appended claims and their equivalents.

Figure 1:
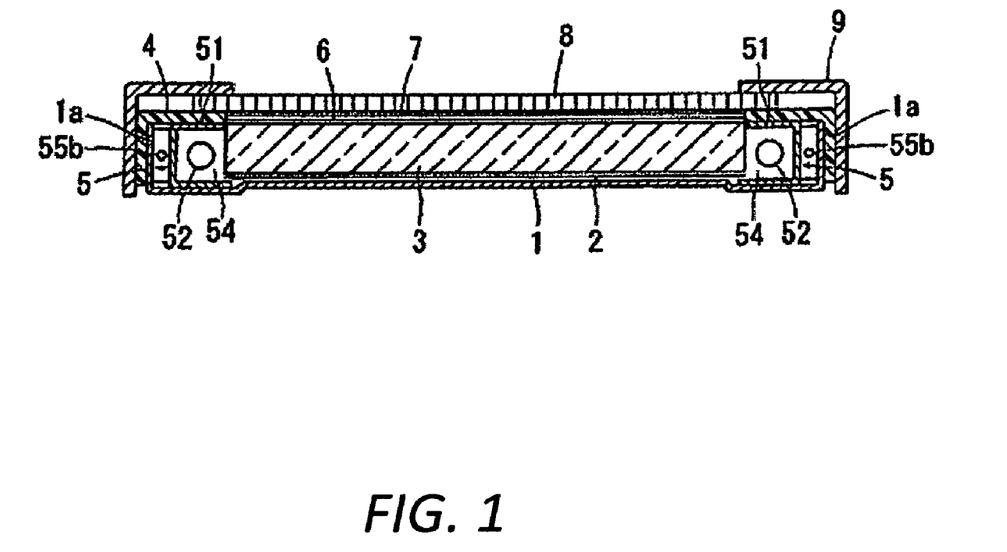
FIG. 1 is a cross sectional view of a liquid crystal module in accordance with one embodiment of the present invention.
Figure 2:
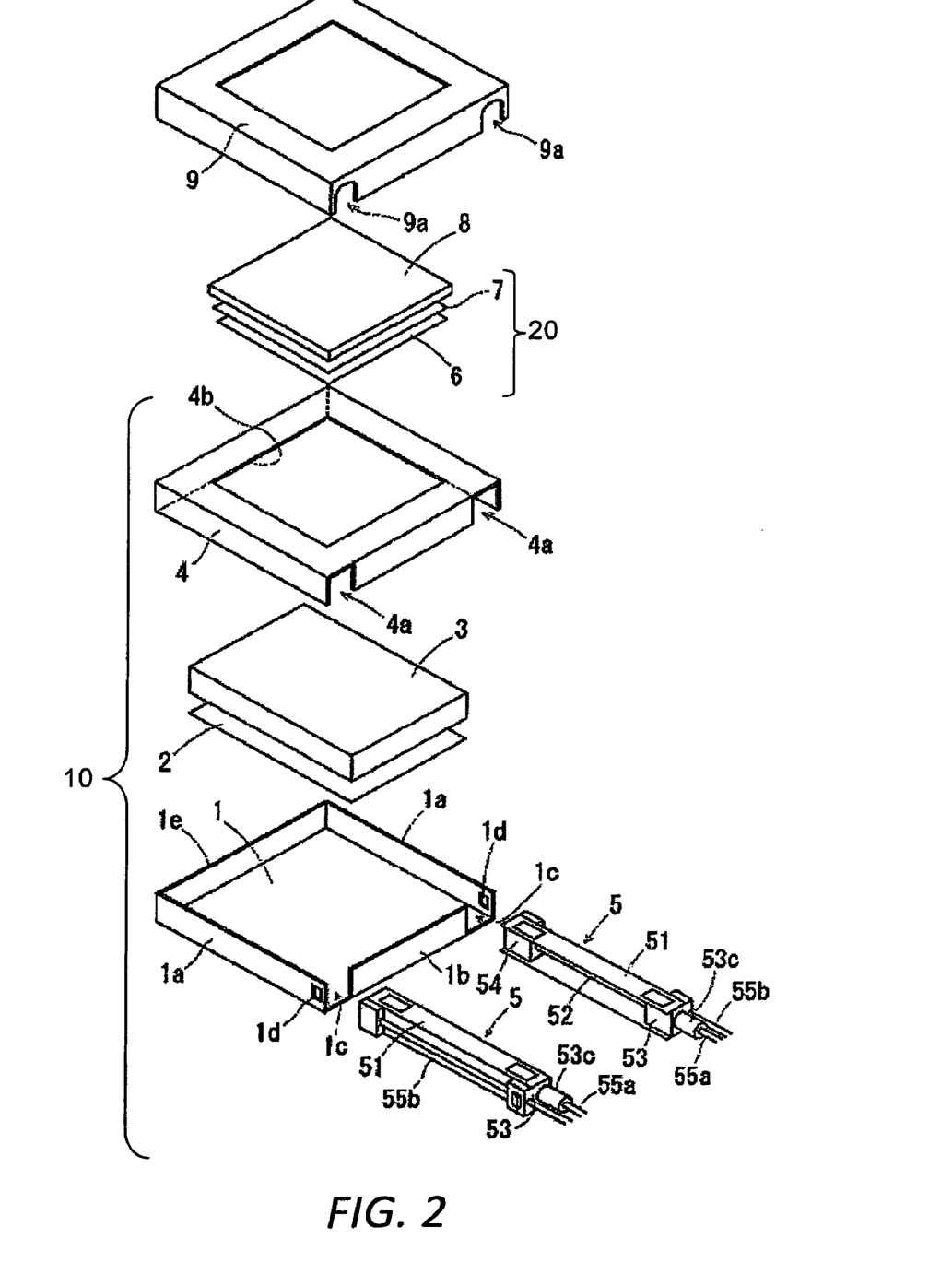
FIG. 2 is an exploded perspective view of the liquid crystal module illustrated in FIG. 1.

As shown in FIGS. 1 and 2, a liquid crystal module includes a back light unit 10, an optical sheet 20, a liquid crystal panel 8 and a bezel 9.

The back light unit 10 is disposed on a rear side of the liquid crystal panel 8. The back light unit 10 is a side-edge-lighted type back light unit. The back light unit 10 has a rear frame 1, a light reflecting sheet 2, a light guide plate 3, a front frame 4 and a pair of left and right lamp reflector assemblies 5. The rear frame 1 and the front frame 4 house the light reflecting sheet 2, the light guide plate 3 and the left and right lamp reflector assemblies 5. The rear frame 1 is made of sheet metal and has a flat, rectangular shape. The rear frame 1 includes left and right side plates 1a, a top side plate 1e and a bottom side plate 1b. The rear frame 1 further has concave cut-outs (e.g., access portions) 1c on left and right sides of the bottom side plate 1b between the bottom side plate 1b and the left and right side plates 1a. The rear frame 1 also has two latching holes 1d formed on the left and right side plates 1a, respectively, at a bottom end portion of each of the left and right side plates 1a. Each of the latching holes 1d has a square shape.

The light reflecting sheet 2 and the light guide plate 3 are stacked and housed inside the rear frame 1. The front frame 4 is made of a synthetic resin and is attached to the rear frame 1. The front frame 4 has a rectangular shape. The front frame 4 defines an opening 4b inside of the front frame 4. The front frame 4 also has concave cut-outs 4a. The concave cut-outs 4a are provided to both sides of a bottom side plate of the front frame 4 at locations corresponding to the concave cut-outs 1c of the rear frame 1. The left and right lamp reflector assemblies 5 are attached between the left and right side plates 1a of the rear frame 1 and left and right side end faces (e.g., outer peripheral faces) of the light guide plate 3, respectively. The left and right lamp reflector assemblies 5 are inserted into the rear frame 1 through left and right insertion openings defined by the concave cut-outs 1c and the concave cut-outs 4a.

The optical sheet 20 includes a light diffusing sheet 6 and a prism sheet 7. The light diffusing sheet 6 and the prism sheet 7 are stacked over the light guide plate 3 of the back light unit 10. Further, the liquid crystal panel 8 is attached superimposed over the front frame 4 so as to cover the opening 4b in the front frame 4. The bezel 9 has a rectangular frame shape. The bezel 9 is made of metal. The bezel 9 is fitted to the front frame 4 from above the liquid crystal panel 8 to form the liquid crystal module. The bezel 9 includes concave cut-outs 9a formed at both sides of a bottom side plate of the bezel 9. A part of the lamp reflector assemblies 5 are taken out from the concave cut-outs 9a.

With the liquid crystal module in this embodiment, the front frame 4 and bezel 9 are used. However, an L-shaped frame or bezel that is split in two can also be used, or a straight frame or bezel that is split in four can also be used.

As shown in FIG. 2, each of the left and right lamp reflector assemblies 5 includes a lamp reflector 51, a cold cathode tube (e.g., light source) 52, bottom and top lamp sockets 53 and 54. The lamp reflector 51 has an open box shape. The cold cathode tube 52 is disposed inside the lamp reflector 51. The bottom and top lamp sockets 53 and 54 are disposed at both longitudinal ends of the cold cathode tube 52 and are fixed to both longitudinal ends of the lamp reflector 51 so that the bottom and top lamp sockets hold the cold cathode tube 52 with respect to the lamp reflector 51. An open side of the lamp reflector 51 faces respective one of the left and right side end faces of the light guide plate 3. Light directly emitted from the cold cathode tubes 52 and light reflected by the lamp reflectors 51 are outputted through the open sides of the lamp reflectors 51, and are incident from the left and right side end faces of the light guide plate 3 on the light guide plate 3. The light exits from a surface (front face) of the light guide plate 3, either directly or after being reflected by the light reflecting sheet 2. Then, the light is diffused by the light diffusing sheet 6, and directionality of the light is increased by the prism sheet 7. Furthermore, the light illuminates the liquid crystal panel 8 from the rear. As a result, a sharp liquid crystal display can be viewed at high brightness and without contrast unevenness.

Figure 3:
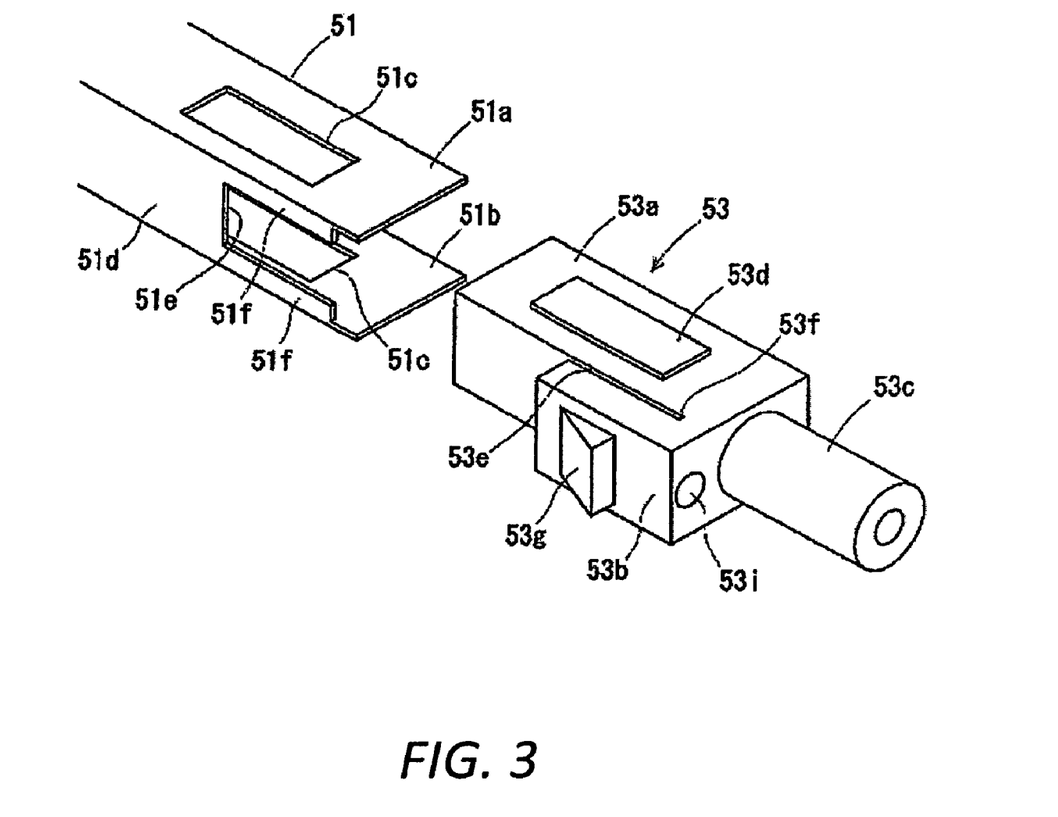
FIG. 3 is an exploded perspective view of a lamp socket and a lamp reflector of the liquid crystal module illustrated in FIG. 1.
Figure 4:
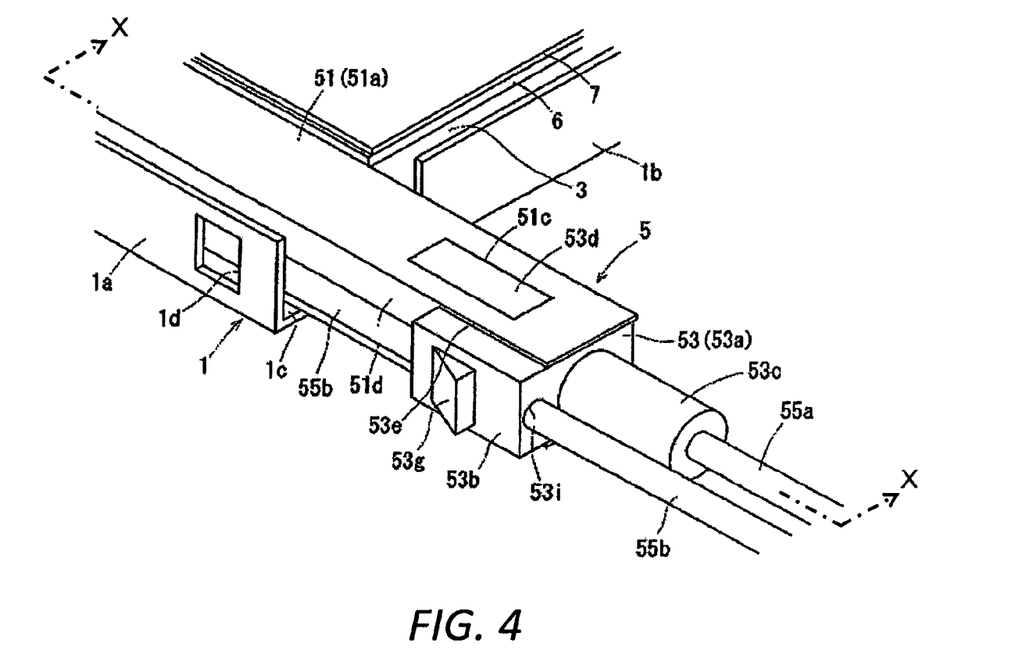
FIG. 4 is an exploded perspective view of a lamp reflector assembly and a rear frame of the liquid crystal module illustrated in FIG. 1.
Figure 10:
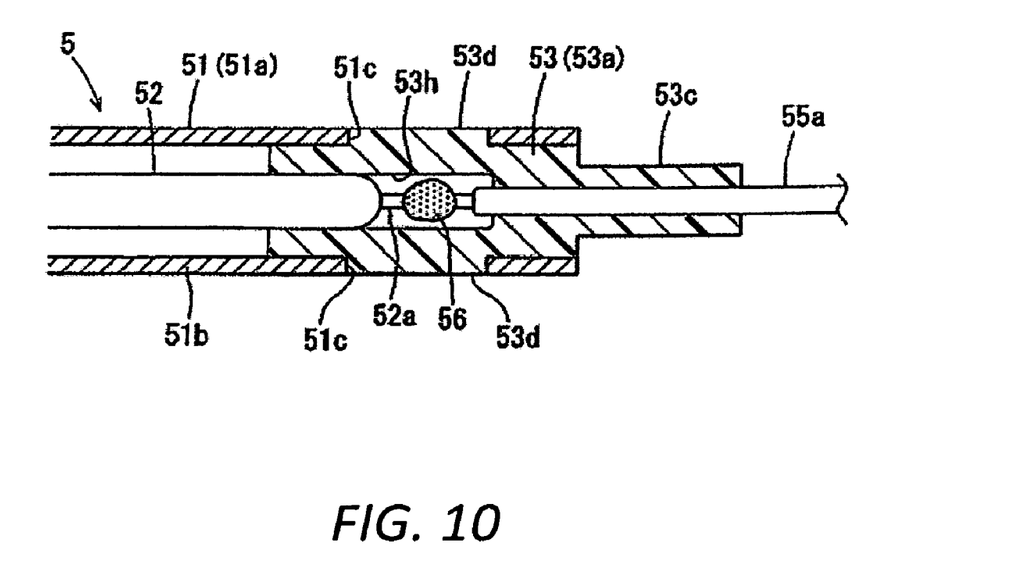
FIG. 10 is a partial cross sectional view of the lamp reflector assembly taken along X-X line shown in FIG. 4.

The lamp reflector assemblies 5 will now be described in further detail. As shown in FIGS. 3, 4 and 10, the lamp reflector 51 includes a front plate 51a, a rear plate 51b and a side end plate 51d. The rear plate 51b faces the front plate 51a. The front and rear plates 51a and 51b include a plurality of fixing holes 51c at both longitudinal end sections of each of the front and rear plates 51a and 51b. In other words, the fixing holes 51c are formed at the longitudinal end sections located at front and rear sides in an insertion direction of each of the lamp reflector assemblies 5 into the rear frame 1. Each of the fixing holes 51c is formed in a rectangular shape. Each of the fixing holes 51c of the front plates 51a is formed at a location corresponding to each of the fixing holes 51c of the rear plates 51b. In other words, each of the fixing holes 51c of the front plates 51a is formed at a location horizontally opposite each of the fixing holes 51c of the rear plates 51b. Each of longitudinal end portions of the side end plate 51d is cut out to form cut-out portions 51e. Each of the longitudinal end portions of the side end plate 51d includes a plurality of tabs 51f formed on front and rear sides of each of the cut-out portions 51e. Each of the tabs 51f formed on the front side of each of the cut-out portions 51e faces each of the tabs 51f formed on the rear side of each of the cut-out portions 51e.

As shown in FIGS. 3, 5 to 8 and 10, each of the bottom lamp sockets 53 is fixed to a lower end portion of each of the lamp reflectors 51. Each of the bottom lamp sockets 53 includes a socket main body 53a, an extension body 53b, a cylindrical component 53c, a pair of fixing protrusions 53d and a latching prong 53g. Each of the bottom lamp sockets 53 is integrally formed as a one-piece unitary member. The socket main body 53a has a cuboids shape. The socket main body 53a is fitted to the lower end portion of each of the lamp reflectors 51. The extension body 53b extends from a side portion of the socket main body 53a. The cylindrical component 53c protrudes from a bottom portion of the socket main body 53a. The fixing protrusions 53d are formed on front and rear faces of the socket main body 53a. Each of the fixing protrusions 53d has a flat, rectangular shape corresponding to a shape of each of the fixing holes 51c. The fixing protrusions 53d are fitted into the fixing holes 51c of the lamp reflectors 51. A pair of front and rear groove-like slits 53e is formed on front and rear side faces of each of the bottom lamp sockets 53 between the socket main body 53a and the extension body 53b. The tabs 51f of the lamp reflector 51 are fitted to the groove-like slits 53e. Each of the front and rear groove-like slits 53e has a closed longitudinal end 53f on a bottom side of each of the groove-like slits 53e. The closed longitudinal end 53f abuts respective one of the tabs 51f when the tabs 51f are inserted into the groove-like slits 53e.

Figure 5:
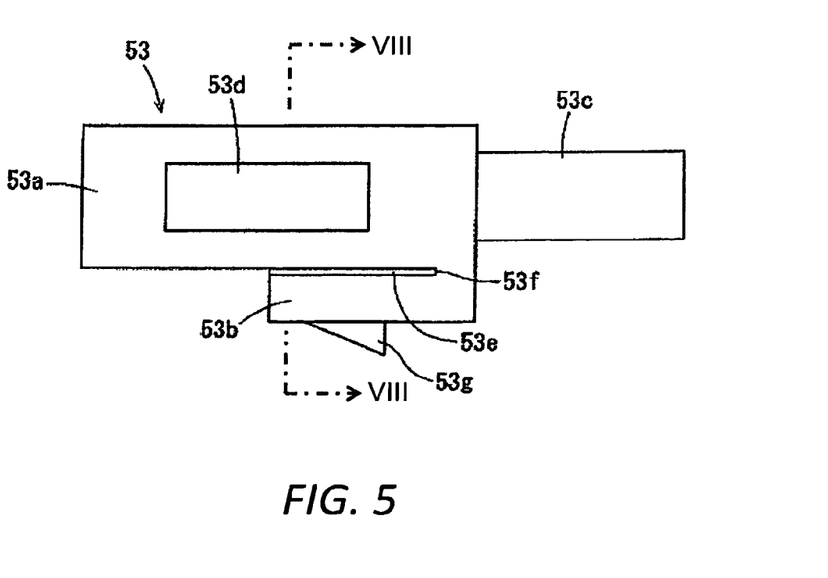
FIG. 5 is an elevational view of the lamp socket of the liquid crystal module illustrated in FIG. 1.

The latching prong 53g has a right triangular shape in a front elevational view. The latching prong 53g protrudes from a side face of the extension body 53b. Each of the latching prong 53g latches respective one of the latching holes 1d when the lamp reflector assemblies 5 are inserted between the left and right side end faces of the light guide plate 3 and the left and right side plates 1a of the rear frame 1. Each of the latching prong 53g serves to hold the lamp reflector assemblies 5 in place. A through-hole 53i is formed in the extension body 53b of each of the bottom lamp sockets 53 to pass through an electrical cable 55b extending from the top lamp socket 54.

Figure 6:
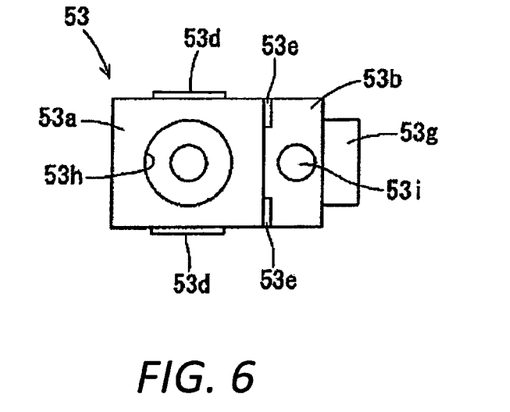
FIG. 6 is a top plan view of the lamp socket illustrated in FIG. 5.
Figure 7:
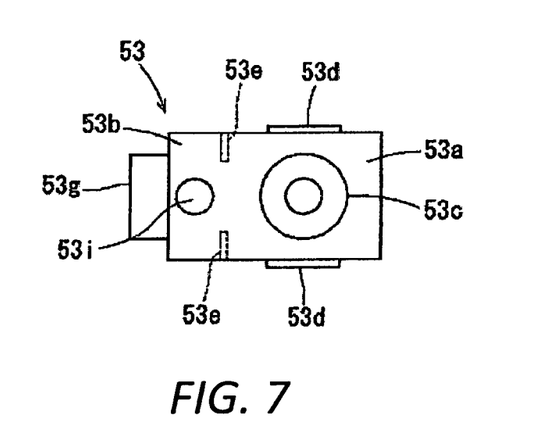
FIG. 7 is a bottom plan view of the lamp socket illustrated in FIG. 5.
Figure 8:
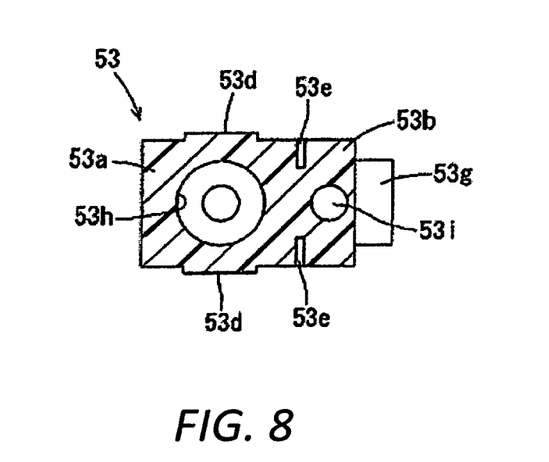
FIG. 8 is a cross sectional view of the lamp socket taken along VIII-VIII line shown in FIG. 5.

As shown in FIGS. 6, 8, and 10, a cavity 53h is formed in the socket main body 53a of each of the bottom lamp sockets 53. A lower distal end portion of the cold cathode tube 52 is inserted in the cavity 53h. A terminal 52a of the cold cathode tube 52 and an exposed lead formed at a distal end of an electrical cable 55a are connected by solder 56 on inside of the cavity 53h. The cylindrical components 53c and the electrical cables 55a and 55b of each of the lamp reflector assemblies 5 are taken out from the concave cut-outs 9a.

Each of the bottom lamp sockets 53 is attached to the lower end portion of each of the lamp reflectors 51 as follows. The tabs 51f of each of the lamp reflectors 51 are inserted into the groove-like slits 53e of each of the bottom lamp sockets 53 while the socket main body 53a of each of the bottom lamp sockets 53 is fitted to the lower end portion of each of the lamp reflectors 51. The fixing protrusions 53d of each of the bottom lamp sockets 53 are fitted into the fixing holes 51c of each of the lamp reflectors 51. The tabs 51f are stopped by the closed longitudinal ends 53f of the groove-like slits 53e.

The bottom lamp socket 53 is positioned by the fixing protrusions 53d fitted in the fixing holes 51c. Furthermore, the bottom lamp socket 53 is also positioned in a width direction of the lamp reflector 51 (a direction perpendicular to the side end plate 51d of the lamp reflector 51) by the tabs 51f inserted in the groove-like slits 53e. Thus, misalignment of each of the bottom lamp sockets 53 can be prevented more reliably than in the past. When each of the bottom lamp sockets 53 is attached, the groove-like slits 53e in which the tabs 51f are inserted serve as guide slits. Specifically, the socket main body 53a is guided straight along an inner face of the lower end portion of each of the lamp reflector 51 in a lengthwise (longitudinal) direction of each of the lamp reflector 51. Thus, attaching the bottom lamp sockets 53 can be accomplished more easily and accurately. Furthermore, the fixing protrusions 53d of each of the bottom lamp sockets 53 can be fitted simply and reliably into the fixing holes 51c of each of the lamp reflectors 51.

Figure 9:
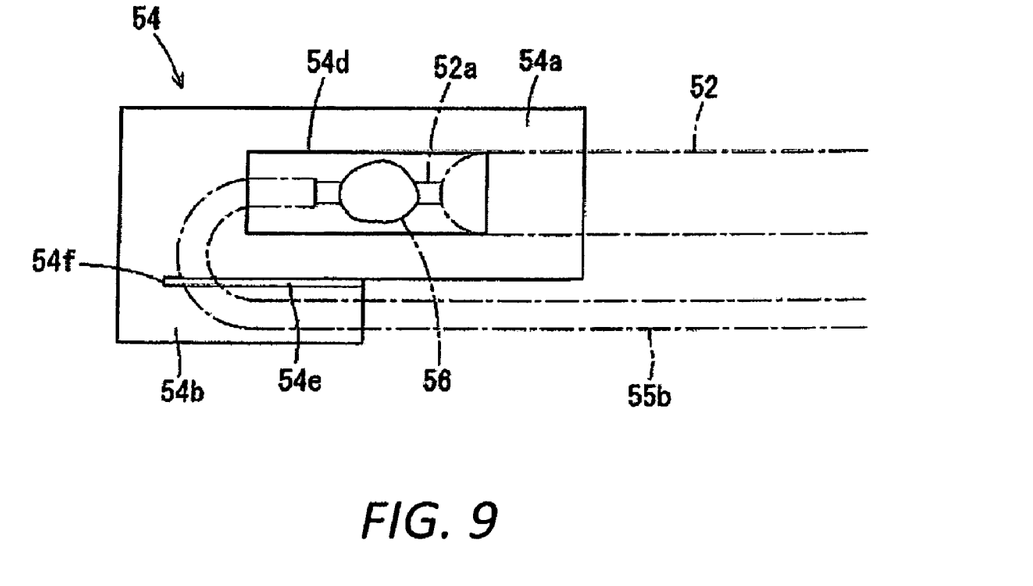
FIG. 9 is a front elevational view of a lamp socket of the liquid crystal module illustrated in FIG. 1.

Each of the top lamp sockets 54 is fixed to an upper end portion of each of the lamp reflectors 51. Except that the latching prong 53g and the cylindrical component 53c are not provided, each of the top lamp sockets 54 is configured substantially the same as each of the bottom lamp sockets 53. Each of the top lamp sockets 54 is made of elastomer material, such as synthetic rubber having electrical insulating properties or the like. As shown in FIG. 9, each of the top lamp sockets 54 has a socket main body 54a, an extension body 54b and a pair of fixing protrusions 54d. The socket main body 54a, the extension body 54b and the fixing protrusions 54d are integrally formed as a one-piece unitary member. The socket main body 54a is fitted to the upper end portion of each of the lamp reflector 51. The extension body 54b extends from a side face of the socket main body 54a. The fixing protrusions 54d are formed on front and rear faces of the socket main body 54a. The fixing protrusions 54d are fitted into the fixing holes 51c of the lamp reflector 51 formed at a top end section of each of the front and rear plates 51a and 51b of the lamp reflector 51. A pair of front and rear groove-like slits 54e is formed on front and rear faces of each of the top lamp sockets 54 between the socket main body 54a and the extension body 54b. The tabs 51f of the lamp reflector 51 are fitted into the groove-like slits 54e. Each of the front and rear groove-like slits 54e has a closed longitudinal end 54f. The closed longitudinal end 54f abuts respective one of the tabs 51f when the tabs 51f are inserted in to the groove-like slits 54e. An upper distal end portion of the cold cathode tube 52 is inserted in a cavity of the socket main body 54a. The electrical cable 55b connected by the solder 56 to the terminal 52a of the cold cathode tube 52 is taken out from an access hole formed in the extension body 54b. Then, the electrical cable 55b passes through the through-hole 53i formed in the extension body 53b.

The tabs 51f of each of the lamp reflectors 51 are inserted into the groove-like slits 54e. The socket main body 54a is fitted to the upper end portion of the lamp reflector 51. The fixing protrusions 54d of the socket main body 54a are fitted into the fixing holes 51c of the lamp reflector 51. The tabs 51f are stopped by the closed longitudinal ends 54f of the groove-like slits 54e. Thus, the top lamp sockets 54 are attached without being misaligned to the upper end portion of each of the lamp reflectors 51.

The lamp reflector assemblies 5 are installed between the left and right side end faces of the light guide plate 3 and the left and right side plates 1a of the rear frame 1 so that the open side of each of the lamp reflectors 51 is opposite respective one of the left and right side end faces of the light guide plate 3. The lamp reflector assemblies 5 are inserted into the rear frame 1 until a top end of each of the lamp reflector assemblies 5 contacts with the top side plate 1e. The latching prong 53g of each of the lamp sockets 53 is latched in the latching hole 1d of each of the left and right side plates 1a of the rear frame 1, which keeps the lamp reflector assemblies 5 from coming loose after attachment. Here, the extension bodies 53b and 54b of the lamp sockets 53 and 54 serve as spacers to maintain a gap between the side end plate 51d of each the lamp reflectors 51 and each of the left and right side plates 1a of the rear frame 1. Thus, there is less resistance upon inserting the lamp reflector assemblies 5, and the assembly work becomes easier. Since the tabs 51f of each of the lamp reflectors 51 hit the closed longitudinal ends 53f of each of the groove-like slits 53e, and the lamp sockets 53 cannot be pushed beyond the lower end portion of the lamp reflector 51, misalignment of the lamp sockets 53 can be prevented more reliably.

The front frame 4 is not shown in FIG. 4, but when the lamp reflector assemblies 5 are attached, the front frame 4 is affixed to the rear frame 1. The concave cut-outs 1c of the rear frame 1 overlap the concave cut-outs 4a of the front frame 4. Then, the lamp reflector assemblies 5 are inserted through the insertion openings thus formed. Thus, a position of the lamp reflector assemblies 5 in frontward or rearward direction is restricted by the rear and front frames 1 and 4, and no tilting occurs.

As discussed above, with the liquid crystal module, misalignment of the top and bottom lamp sockets 53 and 54 of the lamp reflector assemblies 5 can be reliably prevented. Furthermore, the lamp reflector assemblies 5 can be attached simply and reliably without the use of any screws. Thus, there is no need for a bothersome screw threading step, the number of parts and assembly steps is reduced, and the assembly efficiency becomes higher and the manufacturing cost becomes lower. Also, when the cold cathode tube 52 is replaced during maintenance, the latching prong 53g is pushed with a jig and removed from the latching hole 1d. Then, the lamp reflector assemblies 5 can be pulled out. Thus, the cold cathode tube 52 can be replaced very easily. As a result, less work is entailed by replacing the cold cathode tube 52 than with a conventional liquid crystal module.

With the liquid crystal module, if at least one tab and at least one groove-like slit are formed on the lamp reflector 51 and the bottom lamp socket 53 or the top lamp socket 54, misalignment of the bottom lamp socket 53 or the top lamp socket 54 is prevented. However, with the liquid crystal module, the tabs 51c are formed on top and bottom end portions at both front and rear sides of the cut-out portions 51e, and the groove-like slits 53e and 54e are formed on the top and bottom sockets 53 and 54. Thus, the top and bottom lamp sockets 53 and 54 can be positioned uniformly in the width direction of the lamp reflector 51. As a result, misalignment can be prevented much more effectively.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:
1. A liquid crystal module comprising:
a liquid crystal panel; and
a back light unit disposed on a rear side of the liquid crystal panel, the back light unit having
a rear frame,
a light guide plate disposed in the rear frame, and
a lamp reflector assembly disposed between a side wall of the rear frame and an outer peripheral face of the light guide plate, the lamp reflector assembly including
a light source,
a lamp reflector housing the light source, the lamp reflector having a front plate, a rear plate opposing the front plate and a side plate with a tab that is formed on a longitudinal end portion of the side plate, with at least one of the front plate and the rear plate having a fixing hole that is formed on a longitudinal end section of the at least one of the front plate and the rear plate, and
a lamp socket disposed on a longitudinal end of the light source and attached to a longitudinal end of the lamp reflector to hold the light source with respect to the lamp reflector, the lamp socket having a fixing protrusion that is formed on at least one of a front face of the lamp socket and a rear face of the lamp socket at a location corresponding to the fixing hole of the lamp reflector and is fitted into the fixing hole of the lamp reflector, and a slit that is formed at a location corresponding to the tab of the lamp reflector and receives the tab of the lamp reflector.

2. The liquid crystal module according to claim 1, wherein the rear frame further has an access portion through which the lamp reflector assembly is inserted into the rear frame in a longitudinal direction of the lamp reflector assembly.

3. The liquid crystal module according to claim 2, wherein the lamp socket has a latching prong protruding from a side face of the lamp socket, and
the side wall of the rear frame has a latching hole latching the latching prong of the lamp socket to fix the lamp reflector assembly to the rear frame.

4. The liquid crystal module according to claim 1, wherein the tab of the lamp reflector includes front and rear tabs formed on front and rear portions of the side plate of the lamp reflector with a cut-out portion therebetween, and
the slit of the lamp socket includes front and rear slits formed on the front and rear faces of the lamp socket, respectively.

5. The liquid crystal module according to claim 2, wherein the tab of the lamp reflector includes front and rear tabs formed on front and rear portions of the side plate of the lamp reflector with a cut-out portion therebetween, and
the slit of the lamp socket includes front and rear slits formed on the front and rear faces of the lamp socket, respectively.

6. The liquid crystal module according to claim 1, wherein the lamp socket further includes a socket main body fitted inside of the lamp reflector and an extension body integrally formed with the socket main body to extend from the socket main body, and
the slit is formed between the socket main body and the extension body.

7. The liquid crystal module according to claim 2, wherein the lamp socket further includes a socket main body fitted inside of the lamp reflector and an extension body integrally formed with the socket main body to extend from the socket main body, and
the slit is formed between the socket main body and the extension body.

8. The liquid crystal module according to claim 4, wherein the lamp socket further includes a socket main body fitted inside of the lamp reflector and an extension body integrally formed with the socket main body to extend from the socket main body, and
the slit is formed between the socket main body and the extension body.

9. The liquid crystal module according to claim 1, wherein the slit of the lamp socket has a closed longitudinal end that abuts the tab of the lamp reflector in a longitudinal direction of the slit.

10. The liquid crystal module according to claim 2, wherein
the slit of the lamp socket has a closed longitudinal end that abuts the tab of the lamp reflector in a longitudinal direction of the slit.

11. The liquid crystal module according to claim 4, wherein
the slit of the lamp socket has a closed longitudinal end that abuts the tab of the lamp reflector in a longitudinal direction of the slit.

12. The liquid crystal module according to claim 6, wherein
the slit of the lamp socket has a closed longitudinal end that abuts the tab of the lamp reflector in a longitudinal direction of the slit.

13. The liquid crystal module according to claim 3, wherein
the lamp socket further includes a socket main body fitted inside of the lamp reflector and an extension body integrally formed with the socket main body to extend from the socket main body,
the slit is formed between the socket main body and the extension body, and
the latching prong is formed on a side face of the extension body.

* * * * *